Dec. 24, 1935.  A. C. MUFF  2,025,545
ORIFICE PLATE CONSTRUCTION FOR ORIFICE FITTINGS
Filed Nov. 19, 1931
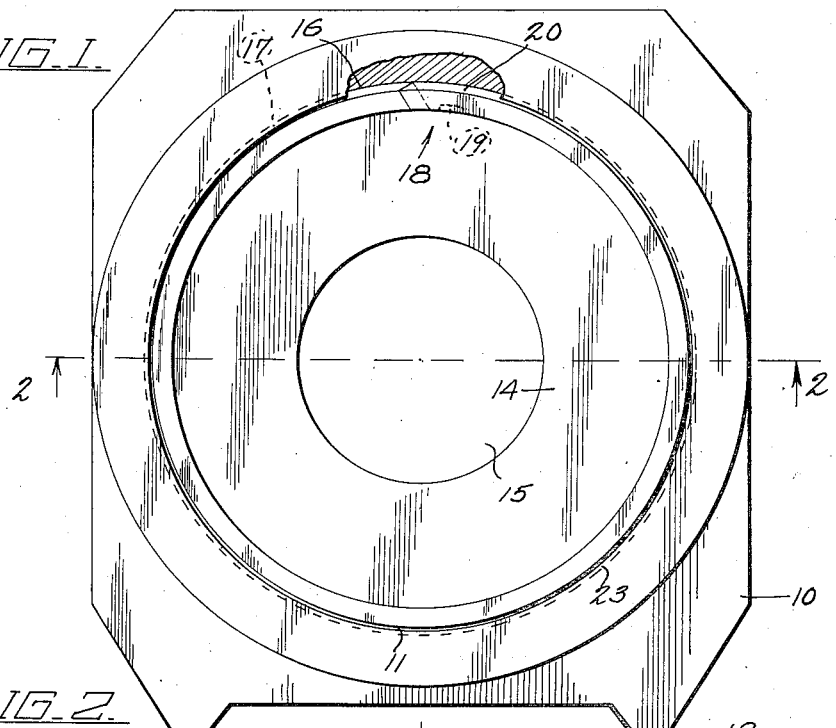
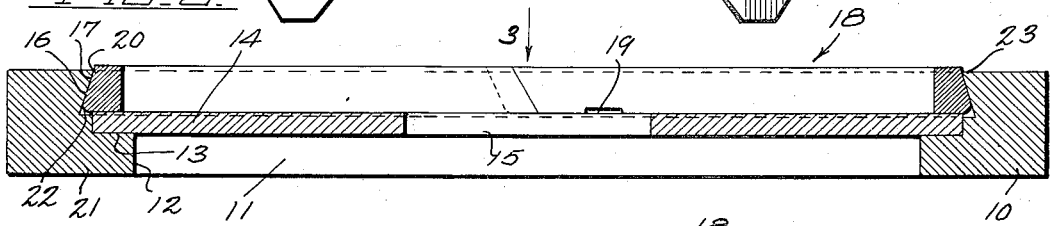
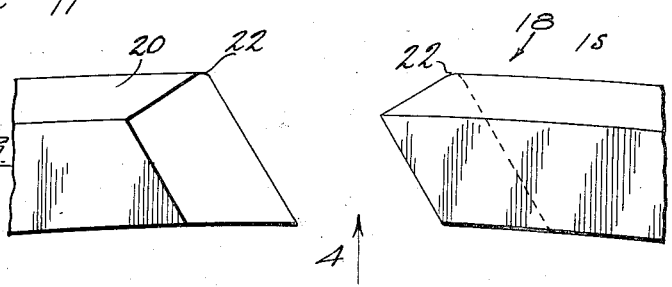
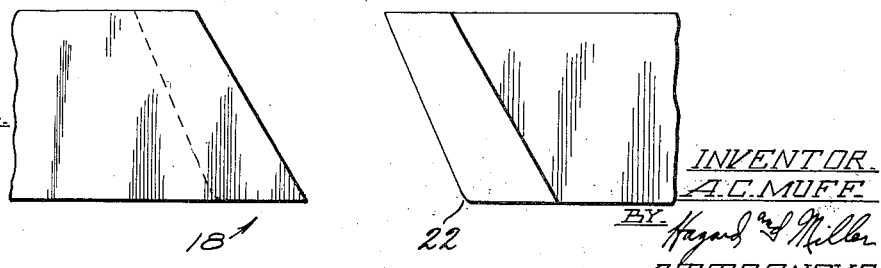
INVENTOR.
A.C. MUFF
ATTORNEYS.

Patented Dec. 24, 1935

2,025,545

UNITED STATES PATENT OFFICE 2,025,545

ORIFICE PLATE CONSTRUCTION FOR ORIFICE FITTINGS

Albert Clifford Muff, Los Angeles, Calif., assignor to Commercial Iron Works of Los Angeles, Los Angeles, Calif., a corporation of California Application November 19, 1931, Serial No. 576,195

6 Claims. (Cl. 138—44)

This invention relates to improvements in orifice plates for orifice fittings and the like.

It has been customary in the construction of orifice fittings to make the orifice plate and carrier of a single piece of metal. In other words the complete body constituting the carrier is positioned in the bore of the orifice fitting and has its central portion of reduced thickness. In this central portion a carefully calibrated orifice is formed. By such a construction there is a considerable waste of metal in that both sides of the carrier must be turned down to the thickness of the plate proper. Also considerable labor is required in turning down the opposite sides of the plate. It is an object of the present invention to provide an improved orifice plate consisting of a carrier having an opening therein, in which is positioned a separate orifice plate. This separate orifice plate may be formed of cold rolled steel or any equivalent material and may be formed of stock which is of uniform thickness. In this manner not only is there a considerable saving of material but also a considerable saving in the manufacture of the plate.

More specifically another object of the invention is to provide a novel means for fastening the plate in position within the carrier so that it cannot be removed therefrom until the plate has been removed from the orifice fitting and the fastening device properly manipulated.

A further object of the invention is to provide an orifice plate for orifice fittings and the like consisting of a carrier having an opening therethrough in which there is formed a seat for the orifice plate which is locked in by an expansion split ring. This expansion ring has beveled surfaces fitting against complementary beveled surfaces in the carrier and has ends so formed that when the ring is in locking position the ends will be in abutment resisting collapse of the ring due to any pressure exerted upon the orifice plate. At the same time by proper manipulation the ring may be collapsed sufficiently to permit its removal from the carrier and permit replacement of the plate proper.

With the foregoing and other objects in view, which will be made manifest in the following detailed description, and specifically pointed out in the appended claims, reference is had to the accompanying drawing for an illustrative embodiment of the invention, wherein:

Fig. 1 is a view in side elevation of the improved orifice plate.

Fig. 2 is a sectional view taken upon the line 2—2 upon Figure 1.

Fig. 3 is a partial top plan of the ends of the retaining ring.

Fig. 4 is an inside elevation of the ends of the ring.

Referring to the accompanying drawing, wherein similar reference characters designate similar parts throughout, the improved orifice plate comprises a carrier 10 constituting the body of the construction and which is adapted to be positioned bodily in the bisection or division of an orifice fitting. This carrier has an opening 11 formed therethrough, one end of which indicated at 12 is of somewhat smaller diameter than the other end. The shoulder 13 between the large and small end of the opening constitutes a seat for the orifice plate proper indicated at 14. As clearly shown on Figure 2, this orifice plate proper is of uniform thickness so that it may be constructed of stock of uniform thickness, such as cold rolled steel or equivalent material. The orifice plate proper is circular in form and has the orifice 15 formed therein. It snugly fits within the enlarged end of the opening while against the seat 13. Adjacent the seat 13 there is formed a groove 16, the diameter of which is slightly greater than the diameter of the orifice plate proper. The outer side of this groove, or that side which is remote from seat 13, is beveled as indicated at 17. This groove is designed to receive an expansible split ring 18 which normally tends to assume a diameter greater than the diameter of groove 16. The split between the ends of the ring 18 is arranged on a plane which is oblique to the radius of the ring as clearly shown in Figures 1 and 3, and which is also oblique to the plane of the ring as clearly shown in Figures 2 and 4. The length of the ring is such that when it is positioned in groove 16 its ends will remain in abutment or be very nearly in abutment. Underneath one end of the ring there is formed a recess 19 which may receive the end of a screw driver or equivalent prying instrument. When a screw driver is positioned in this recess and either pried or twisted, the end of the ring is urged outwardly or away from the orifice plate proper. The beveled surface 20 thereon, which is formed complementary to the beveled surface 17, engages beveled surface 17 and operates to shift this lifted end of the ring inwardly. As the engaging surfaces at the ends of the ring are formed oblique to the radius and oblique to the plane of the ring, they permit this slight inward shifting of the end of the ring during its slight outward movement even though the ends are in abutment. In this way one end of the ring can be removed from the groove and by following around the ring it can be entirely removed from the groove to permit removal of the orifice plate proper and the substitution of another orifice plate having a differently sized orifice. When the ring is replaced, the opposite end of the ring is first positioned in the groove and by following around the ring it can be entirely positioned in the groove. On approaching the other end, the other end will snap into the groove, the double oblique position of the ends of the ring accommodating this movement. The rounded edge 22 on the ring facilitates its sliding over edge 23 on the carrier during insertion of the ring. When the ring is within the groove its ends remain in abutment so that, by having these abutting ends, collapse of the ring is effectively prevented. If the ends are not in exact abutment they are so nearly so that any outward movement of the ring causes them to abut and prevents the ring collapsing and thus being forced out of the groove. In other words, lateral pressure applied to the orifice plate 14 would tend to urge the ring out of the opening. The beveled surfaces 17 and 20 under these conditions would tend to cause the ring to collapse but as the ends of the ring are nearly in abutment, this collapse is prevented. Consequently while the construction is within an orifice fitting it is impossible for the orifice plate 14 to become separated from the carrier. The ring 18, having the beveled surfaces 20 in engagement with the beveled surfaces 17, under the effect of its expansible effort will be crowded toward the orifice plate 14 and cause it to be held firmly against seat 13. As clearly shown in Figure 2, the thickness of the ring 18 is such that its outer surface projects slightly beyond the outer surface of the carrier. In most forms of orifice fittings there is a seat in the bisection or division against which the orifice plate is crowded. In some constructions the orifice plate is crowded against its seat by screws operable from the exterior of the fitting. In other constructions there are annular rings or gears within the orifice fitting which force the orifice plate laterally in the orifice fitting against the side of the bisection. In use of the improved construction the plate may be so positioned in the fitting that the screws, rings, or gears, as the case may be, will be operable on face 21 and when the carrier is forced so that its opposite side engages the above mentioned seat the outer face of ring 18 engages this seat so that it will press the orifice plate proper, indicated at 14, firmly against shoulder 13 and thus prevent leakage around the orifice plate.

It is not necessary, however, for the ring to be positioned on the downstream side when the carrier is in an orifice fitting. I find that the ring forms a sufficiently tight lock so that the carrier may be positioned in the orifice fitting with the ring on either the upstream side or downstream side. The ring serves to lock the orifice plate proper tightly against shoulder 13 against all influence of flow through the orifice plate.

From the above described construction it will be appreciated that a very simple fabricated orifice plate construction has been developed consisting merely of three parts, all of which can be easily formed with a minimum amount of waste material and labor. One orifice plate 14 can be easily and quickly substituted for another by merely prying one end of the ring out of the carrier and following around the ring until it is completely removed. When the parts are in assembled relation, the expansive effort of the ring serves to keep all parts tight and when the construction is seated within the orifice fitting the seating force is effective to form a gas proof seal around the orifice plate proper.

Various changes may be made in the details of construction without departing from the spirit or scope of the invention as defined by the appended claims.

I claim:

1. An orifice plate for orifice fittings and the like comprising a carrier having an opening therethrough, there being a seat exposed on one side of the carrier, an orificed plate positioned against said seat and having a diameter substantially equal to that of the seat so as to fit snugly thereagainst, said carrier having a groove adjacent said seat, and an expansible ring positioned in said groove for locking the orifice plate against said seat.

2. An orifice plate for orifice fittings and the like comprising a carrier having an opening therethrough, there being a seat exposed on one side of the carrier, an orificed plate positioned against said seat and having a diameter substantially equal to that of the seat so as to fit snugly thereagainst, said carrier having a groove adjacent said seat, and an expansible ring positioned in said groove for locking the orifice plate against said seat, said ring projecting outwardly beyond the side of the carrier.

3. An orifice plate for orifice fittings and the like comprising a carrier having an opening therethrough, there being a seat exposed on one side of the carrier, an orificed plate positioned against said seat and having a diameter substantially equal to that of the seat so as to fit snugly thereagainst, said carrier having a groove adjacent said seat, and an expansible split ring positioned in said groove for locking the orifice plate against said seat, said ring having ends which are arranged in abutment when the ring is in locking position.

4. An orifice plate for orifice fittings and the like comprising a carrier having an opening therethrough, there being a seat in the opening exposed on one side of the carrier, an orificed plate positioned against said seat and having a diameter substantially equal to that of the seat so as to fit snugly thereagainst, said carrier having a groove adjacent said seat, and an expansible split ring in the groove, the split between the ends of the ring being arranged on a plane oblique to a radius of the ring and oblique to the plane of the ring, said ring being of such size that when in the groove its ends will be approximately in engagement.

5. An orifice plate for orifice fittings and the like comprising a carrier having an opening therethrough, there being a seat in the opening exposed on one side of the carrier, an orificed plate positioned against said seat and having a diameter substantially equal to that of the seat so as to fit snugly thereagainst, said carrier having a groove adjacent said seat, and an expansible split ring in the groove, the split between the ends of the ring being arranged on a plane oblique to a radius of the ring and oblique to the plane of the ring, said ring being of such size that when in the groove its ends will be in engagement, said ring projecting outwardly beyond the side of the carrier.

6. An orifice plate construction for orifice fittings comprising a carrier having an opening therethrough, the opening being of greater diameter on one side of the carrier than on the other, there being a shoulder in the opening constituting a seat, an orifice plate positioned against the seat having its edges fitting the edges of the seat, said plate being receivable through the large end of the opening, there being a groove in the carrier in the large end of the opening adjacent the edges of the plate, and an expansible split ring in the groove projecting over the edges of the plate for locking the plate in the carrier, the ring presenting a frusto-conical periphery which is tapered outwardly toward the side face of the carrier away from the plate, the carrier presenting a complementary surface engageable thereby so that expansion of the ring in the groove serves to crowd the ring against its seat, the end faces at the ends of the ring being arranged in a plane which is oblique to the axis of the ring and also oblique to the radius of the ring.

ALBERT CLIFFORD MUFF.